(12) United States Patent
Musick

(10) Patent No.: US 9,587,090 B2
(45) Date of Patent: *Mar. 7, 2017

(54) TREATED INORGANIC PIGMENTS HAVING REDUCED PHOTOACTIVITY AND IMPROVED ANTI-MICROBIAL PROPERTIES AND THEIR USE IN POLYMER COMPOSITIONS

(75) Inventor: Charles David Musick, Waverly, TN (US)

(73) Assignee: THE CHEMOURS COMPANY TT, LLC, Harrisburg, PA (US)

( * ) Notice: Subject to any disclaimer, the term of this patent is extended or adjusted under 35 U.S.C. 154(b) by 292 days.

This patent is subject to a terminal disclaimer.

(21) Appl. No.: 14/125,959

(22) PCT Filed: Jun. 20, 2012

(86) PCT No.: PCT/US2012/043241
§ 371 (c)(1),
(2), (4) Date: Dec. 13, 2013

(87) PCT Pub. No.: WO2013/003140
PCT Pub. Date: Jan. 3, 2013

(65) Prior Publication Data
US 2014/0121314 A1    May 1, 2014

Related U.S. Application Data

(60) Provisional application No. 61/501,804, filed on Jun. 28, 2011.

(51) Int. Cl.
*C08K 9/00* (2006.01)
*C08K 9/02* (2006.01)
*C09C 1/36* (2006.01)
*C09C 3/06* (2006.01)

(52) U.S. Cl.
CPC .............. *C08K 9/02* (2013.01); *C09C 1/3653* (2013.01); *C09C 1/3661* (2013.01); *C09C 3/06* (2013.01); *C09C 3/063* (2013.01); *C01P 2004/62* (2013.01); *C01P 2004/84* (2013.01); *C01P 2006/64* (2013.01)

(58) Field of Classification Search
CPC ............ C09D 5/14; C08K 9/02; C09C 1/3661
USPC ........................................ 523/122
See application file for complete search history.

(56) References Cited

U.S. PATENT DOCUMENTS

| | | | |
|---|---|---|---|
| 3,528,837 A | | 9/1970 | Sheehan |
| 3,640,743 A | | 2/1972 | Sheehan |
| 5,180,585 A | * | 1/1993 | Jacobson et al. ............. 424/405 |
| 7,029,648 B2 | | 4/2006 | Subramanian et al. |
| 2005/0223945 A1 | * | 10/2005 | Baumgart et al. ............ 106/481 |
| 2006/0204456 A1 | | 9/2006 | Asakura |
| 2008/0110497 A1 | | 5/2008 | Inoue et al. |
| 2008/0119598 A1 | * | 5/2008 | May .............................. 524/262 |

FOREIGN PATENT DOCUMENTS

| | | |
|---|---|---|
| EP | 1 674 517 | 6/2006 |
| GB | 1459025 | 12/1976 |
| GB | 2242679 | 10/1991 |
| WO | 95/10940 | 4/1995 |

OTHER PUBLICATIONS

Machine translation of JP 1999-194065.*
European Patent Office International Search Report, PCT/US2012/043241, Dated Sep. 20, 2012.
H.B. Clark, "Titanium Dioxde Pigments", Treatise on Coatings, vol. 3, Pigments, Marcel Dekker, 1975 (Book Not Included).

* cited by examiner

*Primary Examiner* — Hannah Pak

(57) ABSTRACT

The disclosure provides a polymer composition comprising a treated inorganic particle having improved photostability and improved anti-microbial properties, wherein the treated inorganic particle comprises: a inorganic core particle; a first treatment of a silicon compound, wherein the silicon compound is added in a single step; and a second treatment comprising a co-precipitated zinc oxide and alumina.

16 Claims, No Drawings

TREATED INORGANIC PIGMENTS HAVING REDUCED PHOTOACTIVITY AND IMPROVED ANTI-MICROBIAL PROPERTIES AND THEIR USE IN POLYMER COMPOSITIONS

BACKGROUND OF THE DISCLOSURE

Field of Disclosure

This disclosure relates to an inorganic oxide pigment, and in particular to titanium dioxide pigment, $TiO_2$, suitable for use in polymer compositions.

Description of the Related Art

High molecular weight polymers, for example, hydrocarbon polymers and polyamides, are melt extruded into shaped structures such as tubing, pipe, wire coating or film by well-known procedures wherein a rotating screw pushes a viscous polymer melt through an extruder barrel into a die in which the polymer is shaped to the desired form, and is then subsequently cooled and solidified into a product, that is, the extrudate, having the general shape of the die. In film blowing processes, as an extruded plastic tube emerges from the die the tube is continuously inflated by air, cooled, collapsed by rolls and wound up on subsequent rolls.

Inorganic powders are added to the polymers. In particular, titanium dioxide pigments are added to polymers for imparting whiteness and/or opacity to the finished article. To deliver other properties to the molded part or film, additional additives are incorporated into the processing step. What is needed is a titanium dioxide that has multiple properties associated with it.

A typical method for combining inorganic pigment particles and polymers utilizes dropping the pigment and polymer through a feed tube into the feed barrel or into the side stuffer of an extruder from which is it then compounded. Alternatively, the inorganic particles can be dropped with the polymer into the cavity of a rotational blender such as a Banbury.

A need exists for a process for the addition of silica, alumina and zinc oxide to the titanium dioxide pigments that provides improved photostability and reduced microbial activity.

SUMMARY OF THE DISCLOSURE

In a first aspect, this disclosure provides a polymer composition comprising a treated inorganic particle, typically an inorganic pigment particle, and more typically a titanium dioxide particle, having improved photostability and improved anti-microbial properties, wherein the treated inorganic particle, typically an inorganic pigment particle, and more typically a titanium dioxide particle, comprises:
  (a) a inorganic core particle, typically titanium dioxide;
  (b) a first treatment of a silicon compound, such as silica, wherein the silicon compound is added in a single step; and
  (c) a second treatment comprising a co-precipitated zinc oxide and alumina By "co-precipitated" we mean the simultaneous or substantially simultaneous precipitation of zinc oxide and alumina.

DETAILED DESCRIPTION OF THE DISCLOSURE

In this disclosure "comprising" is to be interpreted as specifying the presence of the stated features, integers, steps, or components as referred to, but does not preclude the presence or addition of one or more features, integers, steps, or components, or groups thereof. Additionally, the term "comprising" is intended to include examples encompassed by the terms "consisting essentially of" and "consisting of." Similarly, the term "consisting essentially of" is intended to include examples encompassed by the term "consisting of."

In this disclosure, when an amount, concentration, or other value or parameter is given as either a range, typical range, or a list of upper typical values and lower typical values, this is to be understood as specifically disclosing all ranges formed from any pair of any upper range limit or typical value and any lower range limit or typical value, regardless of whether ranges are separately disclosed. Where a range of numerical values is recited herein, unless otherwise stated, the range is intended to include the endpoints thereof, and all integers and fractions within the range. It is not intended that the scope of the disclosure be limited to the specific values recited when defining a range.

In this disclosure, terms in the singular and the singular forms "a," "an," and "the," for example, include plural referents unless the content clearly dictates otherwise. Thus, for example, reference to "$TiO_2$ particle", "the $TiO_2$ particle", or "a $TiO_2$ particle" also includes a plurality of $TiO_2$ particles.

This disclosure relates to novel pigment compositions comprising inert inorganic core particles, typically titanium dioxide particles, having a first treatment of a silicon compound such as silicon dioxide or silica, zinc silicates, or borosilicates, more typically silicon dioxide, and a second treatment of zinc oxide and aluminum oxide that may be used in paints, coatings, caulks, grouts, cements and masonry products and shaped polymeric articles including, but not limited to, films, membranes, fibers, and monofilaments including but not limited to mono-filaments for brushes. In many applications, the compositions of this disclosure can be used to replace all or part of fillers and/or pigments normally used in the product. For example, if $TiO_2$ is selected as the core material, then the resulting particle, when incorporated into a fiber, can deluster the fiber and may also confer anti-microbial activity. The compositions of this disclosure are particularly useful when incorporated in a polymer carrier matrix composite. The physical properties of such composites are similar to those of the polymers themselves.

The inert inorganic particles may be oxides of titanium, aluminum, zinc, copper, iron; the sulfates of calcium, strontium, barium; zinc sulfide; copper sulfide, zeolites; mica; talc; kaolin, mullite, calcium carbonate, or silica. Lead or mercury compound are contemplated equivalent core materials but may be undesirable due to their toxicity. More typical core materials are titanium dioxide, $TiO_2$ and barium sulfate, and most typically titanium dioxide, $TiO_2$.

In a specific embodiment, the $TiO_2$ can be prepared by any of several well-known methods including high temperature vapor phase oxidation of titanium tetrachloride, vapor phase hydrolysis of titanium tetrachloride, hydrolysis of colloidally seeded sulfuric acid solutions of titaniferous raw materials such as ilmenite, and the like. Such processes are well-known in the prior art.

Because the pigment of this disclosure is to be used in applications requiring high light scattering, the size of the initial titanium dioxide core particles should typically be less than one micron, with the average typically falling between 0.15 and 0.25 micron.

Treatments to be applied by the process of this disclosure to the core particles of titanium dioxide can be applied by precipitation in aqueous slurries of the core titanium dioxide particles.

The treatments applied to the core particles in accordance with this disclosure are either porous or dense. The first treatment is with a silicon compound that may be silica or silicon dioxide, zinc silicate, or borosilicate. Silica is typically used because of the ease with which dense, uniform coatings may be obtained. It is applied from a solution of sodium silicate using techniques known to one skilled in the art. To obtain a dense silica treatment, a temperature above 50 C is typical, and more typically above 70 C. The treatment corresponds to about 0.5 to about 20% by weight, more typically about 1 to about 7%, based on the total weight of the titanium dioxide core particle. Silica-coated particles may have a low isoelectric point and may tend to be difficult to disperse in organic materials. The isoelectric point represents the pH at which a particle surface carries zero electric charge. Control of the isoelectric point between 5.5 and 9.5 can be beneficial in facilitating the dispersion and/or flocculation of the particulate compositions during plant processing and in their end use applications.

The amount of silica added in a wet treatment process will often affect the acid solubility of the pigment produced by encapsulating the $TiO_2$ particles. A well encapsulated $TiO_2$ particle will not be dissolved by a strong acid in the acid solubility test. A higher silica level will typically produce a $TiO_2$ product lower in acid solubility. While helpful for reducing acid solubility, the additional silica will typically have negative impacts on gloss, particle size and cost. It is known to add materials to the silica precipitation to improve the uniformity of the coverage of the silica on the $TiO_2$ particle. Borosilicate and zinc silicate are two examples of modifying the silica treatment to improve uniformity of the coverage.

An alternate method of adding a silica coating to the $TiO_2$ particle is a pyrogenic deposition disclosed in U.S. Pat. No. 7,029,648 which is incorporated herein by reference.

The second treatment comprises zinc oxide and aluminum oxide. These treatments are typically porous, applied from a solution of soluble aluminate and a zinc salt using techniques known to one skilled in the art. The pH of the solution during the aluminate treatment will typically range from 3 to 10 at a temperature from 10 C to 90 C. The treatment corresponds to about 0.5 to about 20% by weight, more typically about 1 to about 5%, based on the total weight of the titanium dioxide core particle. Less than about 0.5% can cause poor dispersibility of the pigment in paint formulations and an amount of porous treatment greater than about 20% can cause gloss degradation.

The porous treatment consists essentially of alumina and is obtained by precipitating a soluble aluminate in the presence of the core particles. By "soluble aluminate" is meant alkali metal salts of aluminate anions, for example, sodium or potassium aluminate. The soluble aluminates are generally dissolved at a pH of greater than 10 and are precipitated at a pH of less than 10 and preferably 7.5 to 9.5. Because substantially all of the alumina that is precipitated finds its way to a treatment on the core particles, it typically is only necessary to provide that amount of soluble aluminate to the slurry liquid which will result, after precipitation, in the appropriate degree of treatment.

The alumina may also be a dense treatment. The alumina for the dense treatment is obtained from a cationic source of alumina. The term "cationic source of alumina" refers to aluminum compounds that dissolve in water to yield an acidic solution. Examples include aluminum sulfate, aluminum chloride, aluminum fluoride, basic aluminum chloride, and the like.

The second treatment also comprises a co-precipitation of zinc oxide during the alumina treatment step. This treatment is a porous treatment and is applied from a solution of a zinc salt at a temperature of 10 C to 90 C, and more typically at 25 C to 80 C. The zinc oxide treatment is typically applied with the alumina treatment from a mixture of zinc chloride or zinc sulfate. The zinc oxide treatment is present in the amount of about 0.3% to about 5% by weight, more typically about 0.5% to about 3%, based on the total weight of the titanium dioxide core particle.

The process for forming a treated inorganic particle, more typically a titanium dioxide particle, having improved photostability, and improved anti-microbial properties comprises:
  (a) forming an aqueous suspension of inorganic particles, more typically titanium dioxide particles;
  (b) depositing a first treatment of silicon compound, such as silica, on the core inorganic oxide particles, more typically titanium dioxide particles, wherein the silicon compound is added in a single step;
  (c) depositing a second treatment over the first treatment, said second treatment comprising a zinc salt and an alkaline metal aluminate; and
  (d) recovering the solids, washing free from water soluble species and drying. This process further comprises micronizing the dried particles.

Typically, the silicon addition in step (b) occurs as a wet precipitation at a pH between 4 and 10, more typically between 7 and 9.5, and at a temperature between 50 C and 100 C, and more typically between 70 C and 90 C. Alternately, the silica is deposited pyrogenically in the oxidation process.

Typically, the zinc and aluminate co-precipitation in step (c) occurs at a temperature between 10 C and 90 C, and more typically between 30 C and 80 C, and most typically between 50 C and 75 C.

After the treatments in accordance with this disclosure, the pigment is recovered by known procedures including filtration, washing, drying, sieving, and dry grinding such as micronizing.

Additional agents known by those skilled in the art may be added to the pigment in the above process to enhance polymer processing. Some examples include but are not limited to organics such as triethanolamine, trimethylolethane, or trimethylolpropane, or organosilanes such as octyltriethoxysilane.

Polymer Composition/Polymer Melts

In a polymer composition/melt, the melt-processable polymer that can be employed together with the treated particle of this disclosure comprises a high molecular weight polymer.

Polymers useful in this disclosure are high molecular weight melt processable polymers. By "high molecular weight" it is meant to describe polymers having a melt index value of 0.01 to 50, typically from 2 to 10 as measured by ASTM method D1238-98. By "melt-processable," it is meant a polymer that can be extruded or otherwise converted into shaped articles through a stage that involves obtaining the polymer in a molten state.

Polymers that are suitable for use in this disclosure include, by way of example but not limited thereto, polymers of ethylenically unsaturated monomers including olefins such as polyethylene, polypropylene, polybutylene, and copolymers of ethylene with higher olefins such as alpha olefins containing 4 to 10 carbon atoms or vinyl acetate; vinyls such as polyvinyl chloride, polyvinyl esters such as polyvinyl acetate, polystyrene, acrylic homopolymers and copolymers; phenolics; alkyds; amino resins; epoxy resins, polyamides, polyurethanes; phenoxy resins, polysulfones; polycarbonates; polyesters and chlorinated polyesters; polyethers; acetal resins; polyimides; and polyoxyethylenes. Mixtures of polymers are also contemplated.

Polymers suitable for use in the present disclosure also include various rubbers and/or elastomers, either natural or synthetic polymers based on copolymerization, grafting, or physical blending of various diene monomers with the above-mentioned polymers, all as generally known in the art.

Typically, the polymer may be selected from the group consisting of polyolefin, polyvinyl chloride, polyamide and polyester, and mixture of these. More typically used polymers are polyolefins. Most typically used polymers are polyolefins selected from the group consisting of polyethylene, polypropylene, and mixture thereof. A typical polyethylene polymer is low density polyethylene and linear low density polyethylene.

Other Additives

A wide variety of additives may be present in the polymer composition produced by the process of this disclosure as necessary, desirable or conventional. Such additives include polymer processing aids such as fluoropolymers, fluoroelastomers, etc., catalysts, initiators, anti-oxidants (e.g., hindered phenol such as butylated hydroxytoluene), blowing agent, ultraviolet light stabilizers (e.g., hindered amine light stabilizers or "HALS"), organic pigments including tinctorial pigments, plasticizers, antiblocking agents (e.g. clay, talc, calcium carbonate, silica, silicone oil, and the like) leveling agents, flame retardants, anti-cratering additives, and the like.

Preparation of the Polymer Composition

The present disclosure provides a process for preparing a particle-containing, high molecular weight polymer composition. Typically, in this process, the inorganic particle, such as titanium dioxide, may be surface treated in accordance with this disclosure. This step can be performed by any means known to those skilled in the art. Both dry and wet mixing may be suitable. In wet mixing, the particle may be slurried or dissolved in a solvent and subsequently mixed with the other ingredients.

In one embodiment of the disclosure, the treated particle may be contacted with a first high molecular weight melt processable polymer. Any melt compounding techniques, known to those skilled in the art may be used. Generally, the treated particle, other additives and melt-processable polymer are brought together and then mixed in a blending operation, such as dry blending, that applies shear to the polymer melt to form the particle containing, more typically pigmented, polymer. The melt-processable polymer is usually available in the form of particles, granules, pellets or cubes. Methods for dry blending include shaking in a bag or tumbling in a closed container. Other methods include blending using agitators or paddles. Treated particle, and melt-processable polymer may be co-fed using screw devices, which mix the treated particle, polymer and melt-processable polymer together before the polymer reaches a molten state. Alternately, the components may be fed separately into equipment where they may be melt blended, using any methods known in the art, including screw feeders, kneaders, high shear mixers, blending mixers, and the like. Typical methods use Banbury mixers, single and twin screw extruders, and hybrid continuous mixers.

Processing temperatures depend on the polymer and the blending method used, and they are well known to those skilled in the art. The intensity of mixing depends on the polymer characteristics.

The treated particle containing polymer composition produced by the process of this disclosure is useful in production of shaped articles. The amount of particle present in the particle-containing polymer composition and shaped polymer article will vary depending on the end use application. However, typically, the amount of particle in the polymer composition ranges from about 30 to about 90 wt %, based on the total weight of the composition, typically, about 50 to about 80 wt %. The amount of particle in an end use, such as a shaped article, for example, a polymer film, can range from about 0.01 to about 20 wt %, and is typically from about 0.1 to about 15 wt %, more typically about 5 to about 10 wt %.

A shaped article is typically produced by melt blending the treated particle containing polymer which comprises a first high molecular weight melt-processable polymer, with a second high molecular weight melt-processable polymer to produce the polymer that can be used to form the finished article of manufacture. The treated particle containing polymer composition and second high molecular weight polymer are melt blended, using any means known in the art, as disclosed hereinabove. In this process, twin-screw extruders are commonly used. Co-rotating twin-screw extruders are available from Werner and Pfleiderer. The melt blended polymer is extruded to form a shaped article.

Inorganic particles treated in accordance with this disclosure are capable of being dispersed throughout the polymer melt. Typically the treated inorganic particle can be uniformly dispersed throughout the polymer melt. Such particles may exhibit some minor degree of clumping together within the polymer. A minor amount of the particles may also migrate to the surface of the polymer melt but any such migration would not be to a degree sufficient for the particle to qualify as a surface active material such as an antiblock agent.

In one embodiment, the disclosure relates to a polymer composition that can be used as a masterbatch. When used as a masterbatch, the polymer can provide both opacity and viscosity attributes to a polymer blend that can be utilized to form shaped articles.

The examples which follow, description of illustrative and typical embodiments of the present disclosure are not intended to limit the scope of the disclosure. Various modifications, alternative constructions and equivalents may be employed without departing from the true spirit and scope of the appended claims. In one embodiment, the polymer films may be substantially free of other conventional colorants and contain solely the treated titanium dioxide pigments of this disclosure.

TEST METHODS

In the examples which follow, the test results were obtained by the procedures described below.

Nujol Yellowing Test

This test determined resistance to yellowing in plastics, a measure of photochemical discoloration.

A masterbatch of test medium was made by compounding 100 grams of Nujol, 2 grams of butylated hydroxyl toluene (BHT), 2 grams of Tinuvin 770, a commercial hindered amine antioxidant, and 10 grams of Vaseline for thickening. 1.2 grams of masterbatch was mulled with 0.64 grams of the $TiO_2$ pigment to a smooth dispersion.

A doctor blade was used to form a thin film of the masterbatch/pigment composite on a microscope slide. The color components L*, A*, and B*, were measured using a Lab-Scan spectrocolorimeter. The film was exposed to 24 hours of ultra violet radiation in a temperature-controlled enclosed box. The color components were then measured. The change in b* is a measure of yellowing stability. The lower the value of delta b* the more photostable the pigment. Commercially available photostable pigments for plastic's applications have a Nujol Yellowing value less than 3.

Emulsion Gloss

Emulsion (TFW-182) Gloss was determined by preparing an emulsion paint formulation using a slurry sample produced from 76.5% $TiO_2$ solids in water. 100 grams of emulsion gloss masterbatch based on acrylic emulsion resin (Primal AC-388 from Rohm & Haas, a subsidiary of Dow Chemicals, Midland, Mich.) (27% Pigment Volume Concentration) should be used. The paint was produced by mixing 100 grams of masterbatch, 40.3 grams of slurry, and 0.7 grams of water. Draw-downs of the paint were made on black PVC panels, the panels were dried for 3 hours in a constant temperature, constant humidity (CTCH) cabinet, and 60 degree gloss was measured using a Hunter gloss meter (available from Hunter Laboratories, Reston, Va.), and gloss was calculated in relation to reflectance values of standards.

EXAMPLES

The disclosure will be better understood with reference to the following illustrative examples. Properties of the pigments prepared as in the examples, and those of several commercial pigments, for comparison, are shown in the Tables. All percentages are on a weight basis.

Comparative Example 1

Five gallons of $TiO_2$ slurry at ~325 grams per liter concentration were added to a small stirred tank. The pH was adjusted to 9.5 using 20% caustic. The slurry was heated to 90 C. Sodium silicate solution was added to the small stirred tank over a period of 30 minutes in an amount sufficient to add 4.3% $SiO_2$. The pH was maintained at 9.5 with dilute hydrochloric acid. The material was stirred for 30 minutes. The slurry was cooled to 75 C with time and ice. The pH was lowered to 8.2 using hydrochloric acid. Sodium aluminate solution was added to the small stirred tank over a period of 60 minutes in an amount sufficient to add 1.2% $Al_2O_3$. The pH was held at 8.2 with dilute HCl. The material was stirred for 30 minutes. The material was filtered, dried, screened and micronized. Nujol Yellowing was measured on the pigment. The results are shown in Table 1.

Example 1

Five gallons of $TiO_2$ slurry at ~325 grams per liter concentration were added to a small stirred tank. The pH was adjusted to 9.5 using 20% caustic. The slurry was heated to 90 C. Sodium silicate solution was added to the small stirred tank over a period of 30 minutes in an amount sufficient to add 4.3% $SiO_2$. The pH was maintained at 9.5 with dilute hydrochloric acid. The material was stirred for 30 minutes. The slurry was cooled to 75 C with time and ice. The pH was lowered to 8.2 using hydrochloric acid. Sodium aluminate solution was added to the small stirred tank over a period of 60 minutes in an amount sufficient to add 1.2% $Al_2O_3$. Simultaneously, a zinc chloride solution was added at an amount sufficient to add 1.5% ZnO. The pH was held at 8.2 with dilute HCl. The material was stirred for 30 minutes. The material was filtered, dried, screened and micronized. Nujol Yellowing was measured on the pigment. The results are shown in Table 1.

Example 2

Example 1 was repeated with the following exception: zinc chloride solution was added at an amount sufficient to add 2.1% ZnO. Results are shown in Table 1.

Example 3

Example 1 was repeated with the following exception: zinc chloride solution was added at an amount sufficient to add 3.6% ZnO. Results are shown in Table 1.

TABLE 1

| Example | % ZnO | Nujol Yellowing |
|---------|-------|-----------------|
| C1 | 0 | 3.8 |
| 1 | 1.5 | 1.3 |
| 2 | 2.1 | 1.0 |
| 3 | 3.6 | 0.9 |

Comparative Example 2

Comparative Example 1 was repeated with the following exceptions: Sodium silicate solution was added in an amount sufficient to add 3% $SiO_2$. Sodium aluminate solution was added in an amount sufficient to add 1.3% $Al_2O_3$. The pigment was made into a TFW-182 paint formulation. The results are shown in Table 2.

Example 4

Comparative Example 2 was repeated with the following exception: Simultaneously with the addition of the sodium aluminate solution, a zinc chloride solution was added at an amount sufficient to add 1.6% ZnO. The results are shown in Table 2.

Example 5

Example 5 was repeated with the following exception: zinc chloride solution was added at an amount sufficient to add 2.3% ZnO. The results are shown in Table 2.

Example 6

Example 5 was repeated with the following exception: zinc chloride solution was added at an amount sufficient to add 3.6% ZnO. The results are shown in Table 2.

Results for Comparative Example 2 and Examples 4-6

The paints produced in the four examples above were painted onto boards and given external North facing exposure to enhance mildew growth. Digital images of the boards were taken after 18 months of exposure and analyzed for discoloration using a Hunter Labscan to measure whiteness (L*) as a proxy for discoloration due to mildew growth (decreased L* with time equates to increased mildew growth). The data showed that the L* of the sample produced in the comparative example was statistically lower than the L* of the three sample with zinc co-precipitated with the alumina.

TABLE 2

| Example | % ZnO | Average L* |
|---------|-------|------------|
| C2 | 0 | 71.9 |
| 4 | 1.5 | 75.5 |
| 5 | 2.3 | 76.9 |
| 6 | 3.6 | 74.2 |

What is claimed is:

1. A polymer composition comprising a treated inorganic particle having improved photostability and improved antimicrobial properties, wherein the treated inorganic particle comprises:
   a. an inorganic core particle, wherein the inorganic core particle is titanium dioxide;
   b. a first treatment of a silicon compound encapsulating the titanium dioxide core particle, wherein the silicon compound has been deposited onto the titanium dioxide core particle in a single step; and
   c. a second treatment over the first treatment, said second treatment comprising a zinc oxide and alumina that has been simultaneously precipitated onto the first treatment, wherein the zinc oxide is present in the amount of about 0.3 to about 5% by weight, based on the total weight of the titanium dioxide core particle and the treated inorganic particle has a Nujol yellowing less than about 3.0.

2. The polymer composition of claim 1 further comprising a high molecular weight melt processable polymer.

3. The polymer composition of claim 2 wherein the high molecular weight processable polymer is selected from the group consisting of polymer of ethylenically unsaturated monomers; copolymer of ethylene with higher olefins; vinyl polymer, polyvinyl ester; polystyrene; acrylic homopolymer; acrylic copolymer; phenolic polymer; alkyd polymer; amino resin; epoxy resin, polyamide, polyurethane; phenoxy resin, polysulfone; polycarbonate; polyester and chlorinated polyester; polyether; acetal resin; polyimide; polyoxyethylenes; rubber, elastomer; natural or synthetic polymer based on copolymerization and mixtures thereof.

4. The polymer composition of claim 3 wherein the high molecular weight melt processable polymer is selected from the group consisting of polyolefin, polyvinyl chloride, polyamide, polyester, and mixtures thereof.

5. The polymer composition of claim 4 wherein the high molecular weight melt processable polymer is polyolefin.

6. The polymer composition of claim 5 wherein the polyolefin is selected from the group consisting of polyethylene, polypropylene, and mixture thereof.

7. The polymer composition of claim 1 further comprising additives selected from the group consisting of polymer processing aid, catalyst, initiator, anti-oxidant, blowing agent, ultraviolet light stabilizer, organic pigment, plasticizer, antiblocking agent, leveling agent, flame retardant, and anti-cratering additive.

8. The polymer composition of claim 2 wherein the treated inorganic particle is present in the amount of about 30 to about 90% by weight, based on the total weight of the polymer composition.

9. The polymer composition of claim 1 wherein the silicon compound is silica.

10. The polymer composition of claim 9 wherein the silica is a pyrogenically added silica.

11. The polymer composition of claim 9 wherein the silica is applied using wet treatment.

12. The polymer composition of claim 1 wherein the silicon compound is present in the amount of about 0.5 to about 20% by weight, based on the total weight of the titanium dioxide core particle.

13. The polymer composition of claim 1 wherein the alumina is present in the amount of about 0.05% to about 20% by weight calculated as $Al_2O_3$ and based on the total weight of the titanium dioxide core particle.

14. The polymer composition of claim 1 wherein the treated inorganic particle has a Nujol yellowing less than about 1.5.

15. A part comprising the polymer composition of claim 1.

16. The part of claim 15 wherein the part is a shaped article.

* * * * *